United States Patent [19]

Sheng et al.

[11] Patent Number: 4,579,569
[45] Date of Patent: Apr. 1, 1986

[54] APPARATUS FOR NEUTRALIZING AND REMOVING FUMES

[75] Inventors: Henry P. Sheng, Claremont; Martin E. Tellkamp, Whittier, both of Calif.

[73] Assignee: Fume-Klean, Santa Fe Springs, Calif.

[21] Appl. No.: 663,300

[22] Filed: Oct. 22, 1984

Related U.S. Application Data

[60] Division of Ser. No. 434,258, Oct. 14, 1982, abandoned, which is a continuation-in-part of Ser. No. 222,048, Jan. 2, 1981, abandoned.

[51] Int. Cl.⁴ .................... B01D 47/06; B01D 47/12
[52] U.S. Cl. ........................................ 55/223; 55/233; 55/238; 55/259; 55/260; 261/79 A; 422/169; 422/176
[58] Field of Search ................. 422/169, 170, 176; 55/223, 233, 235–238, 259, 260, 458; 261/79 A

[56] References Cited

U.S. PATENT DOCUMENTS

| | | |
|---|---|---|
| 2,962,344 | 11/1960 | Kurmeier . |
| 2,972,393 | 2/1961 | Bush . |
| 3,233,882 | 2/1966 | Calaceto . |
| 3,660,019 | 5/1972 | Predikant et al. .................. 422/169 |
| 3,773,472 | 11/1973 | Hausberg et al. .................. 422/169 |
| 3,789,109 | 1/1974 | Lyon et al. ........................ 55/259 |
| 3,961,018 | 6/1976 | Williamson . |
| 4,022,593 | 5/1977 | Lerner ............................. 55/259 |
| 4,029,752 | 6/1977 | Cahn . |

FOREIGN PATENT DOCUMENTS

| | | |
|---|---|---|
| 637374 | 2/1962 | Canada ............................. 55/260 |
| 183796 | 5/1963 | Sweden ............................ 261/79 A |
| 816511 | 3/1981 | U.S.S.R. ........................... 55/238 |

Primary Examiner—David L. Lacey
Attorney, Agent, or Firm—F. Eugene Logan

[57] ABSTRACT

An apparatus for neutralizing basic fumes and acidic fumes and absorbing such fumes and the salts thereof in a liquid solvent comprising a vertically extending, columnar housing; a cylindrical gas flow passage at the bottom of the housing in inwardly spaced relationship therefrom; a tangential gas inlet connected to the inlet of the cylindrical gas flow passage extending through the housing and sealed from direct communication therewith; a conical, upwardly converging gas flow passage the inlet of which is connected in gas tight sealing relationship to the top and outlet of the cylindrical gas flow passage; downwardly directed liquid solvent spraying apparatus disposed in the housing above the outlet of the conical passage and directed downwardly along the projection of the axis of the conical passage; first coalescing apparatus disposed in the housing at a first elevation above the spraying apparatus and extending radially across the housing and abutting the entire circumference thereof at the first elevation, for receiving a gaseous stream with an entrained liquid solvent from the lower part of the housing and for coalescing such liquid solvent; absorption apparatus disposed in the housing at a second elevation above the first coalescing apparatus and extending radially across the housing and abutting the entire circumference thereof at the second elevation, for receiving a gaseous stream containing basic and acidic fumes from the first coalescing apparatus and for absorbing, when suitably wetted with a liquid solvent, such basic and acidic fumes.

8 Claims, 3 Drawing Figures

APPARATUS FOR NEUTRALIZING AND REMOVING FUMES

CROSS-REFERENCES TO RELATED APPLICATIONS

This is a divisional application of Ser. No. 434,258 filed Oct. 14, 1982, now abandoned, which is a continuation-in-part of Ser. No. 222,048, filed Jan. 2, 1981, now abandoned.

BACKGROUND OF THE INVENTION

This invention relates to fume scrubbing and, more particularly to, a method and apparatus for neutralizing and removing from a carrier acidic and basic fumes.

A number of manufacturing processes in industry use acidic and basic baths. For example, the process of anodizing aluminum for weather resistant uses employs a basic bath, such as sodium hydroxide, for etching the aluminum and an acidic bath, such as sulphuric acid, for anodizing the aluminum. In order to protect employees and machinery from being contaminated by harmful fumes, exhaust hoods are mounted over the tanks that contain the baths. To prevent the discharge of toxic material into the atmosphere, the exhaust gas from each bath must be scrubbed to remove the fumes therefrom. Heretofore, the exhaust gas from the acidic bath and the exhaust gas from the basic bath have been separately scrubbed.

SUMMARY OF THE INVENTION

According to the invention, exhaust gases from acidic and basic baths are scrubbed by mixing the gases to combine chemically the acidic and basic fumes, thereby neutralizing them and forming a salt, and by removing the salt with a solvent moving countercurrent to the mixed gases.

One aspect of the invention is a method for neutralizing acidic fumes and basic fumes. First, the acidic fumes and basic fumes are mixed in a nontoxic carrier gas. The carrier gas is essentially non-reactive with the basic and acidic fumes at least under the required operating condition of the invention. Then, an upward swirling accelerated motion is imparted to the carrier in such a manner as to cause closer contact of, higher concentration of, and higher rate of neutralization of the basic and acidic fumes, thereby forming a salt. Next, a solvent for the salt is sprayed downwardly onto the upwardly moving carrier to dissolve the salt in the solvent. The solvent is heavy enough to fall. The fallen solvent is collected and the carrier is exhausted into the atmosphere. In one embodiment of this invention the solvent is recycled for treating additional basic and acidic fumes.

Another aspect of the invention is apparatus for neutralizing acidic fumes and basic fumes. A cylindrical, vertically extending gas passage is disposed at the bottom of a vertically extending, columnar housing. The cylindrical passage has a tangential inlet to generate a cyclone motion. A conical, upwardly converging gas passage is connected to the top of the cylindrical passage. In one embodiment the top of the conical passage has a dish-shaped exit.

The suction side of a blower is connected to an outlet at the top of the housing. In another embodiment a plurality of downwardly directed solvent spray heads are disposed one on top of the other between the conical passage and the outlet. Preferably, the spray heads have an outward and downward spray pattern. The cylindrical passage and the region between the cylindrical passage and the housing are both connected to a solvent storage sump. A pump applies solvent under pressure from the sump to the spray heads. Preferably, a bed of material for removing solvent vapor or mist is disposed above the spray heads and again at the top of the housing adjacent to the outlet and a bed of absorbent material is disposed between the solvent-vapor, or mist removing beds.

In general the liquid solvent is essentially non-reactive with the basic and acidic fumes and the salt thereof except for the absorbing and dissolving capability of solvent to the basic and acidic fumes and the salt thereof. In general the solvent does not contain a chemical which is reactive with the basic and acidic fumes, or the salt thereof except for the basic or acidic fumes already absorbed or dissolved in said solvent as in the embodiment where the solvent is recycled.

Furthermore, in general it is not necessary to pretreat the streams containing the basic and acidic fumes before such streams are combined and the fumes thereof are absorbed by the solvent.

BRIEF DESCRIPTION OF THE DRAWINGS

The features of a specific embodiment of the best mode contemplated of carrying out the invention are illustrated in the drawings, in which:

FIG. 3 is a schematic top-sectional view of the apparatus of FIG. 2 taken through plane 3—3.

DETAILED DESCRIPTION OF THE SPECIFIC EMBODIMENT

Figure 1:
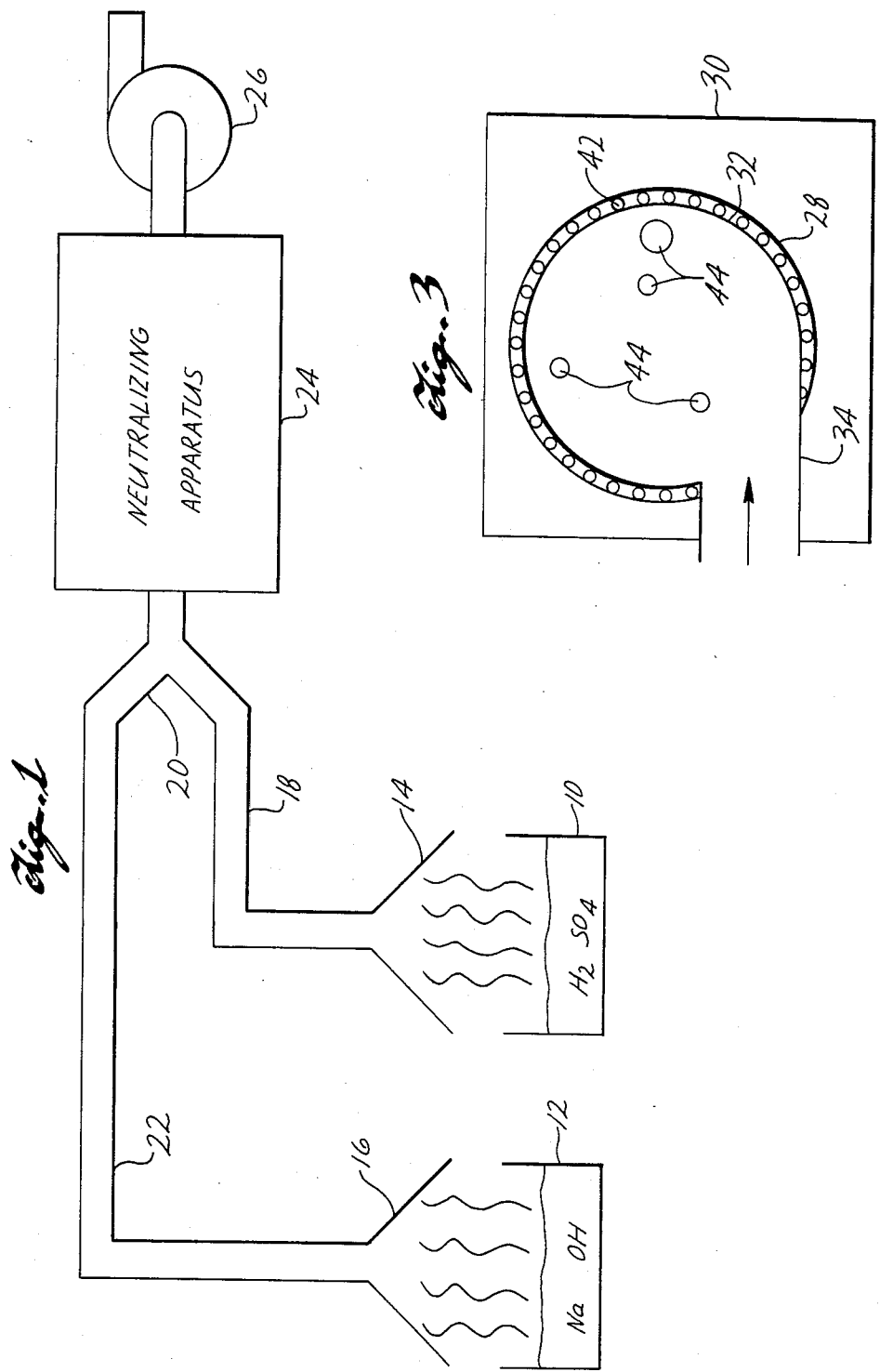
FIG. 1 is a schematic diagram of a manufacturing process in connection with which the method and apparatus of the invention may be employed.

In FIG. 1, an acidic bath, such as sulfuric acid, is contained in a tank 10 and a basic bath, such as sodium hydroxide, is contained in a tank 12. A hood 14 overlies tank 10 and a hood 16 overlies tank 12. A conduit 18 connects hood 14 to one leg of a Y-section 20. A conduit 22 connects hood 16 to another leg of Y-section 20. The third leg of Y-section 20 is connected to the inlet of neutralizing apparatus 24. The vacuum side of a blower 26 is connected to the outlet of neutralizing apparatus 24. Blower 26 draws fumes, represented by wavy lines, from tanks 10 and 12 mixed with air as a carrier gas into hoods 14 and 16 and through neutralizing apparatus 24. The environs of tanks 10 and 12 are thus kept substantially free of harmful fumes. The acidic and basic fumes are mixed by Y-section 20 prior to entering neutralizing apparatus 24.

Figure 2:
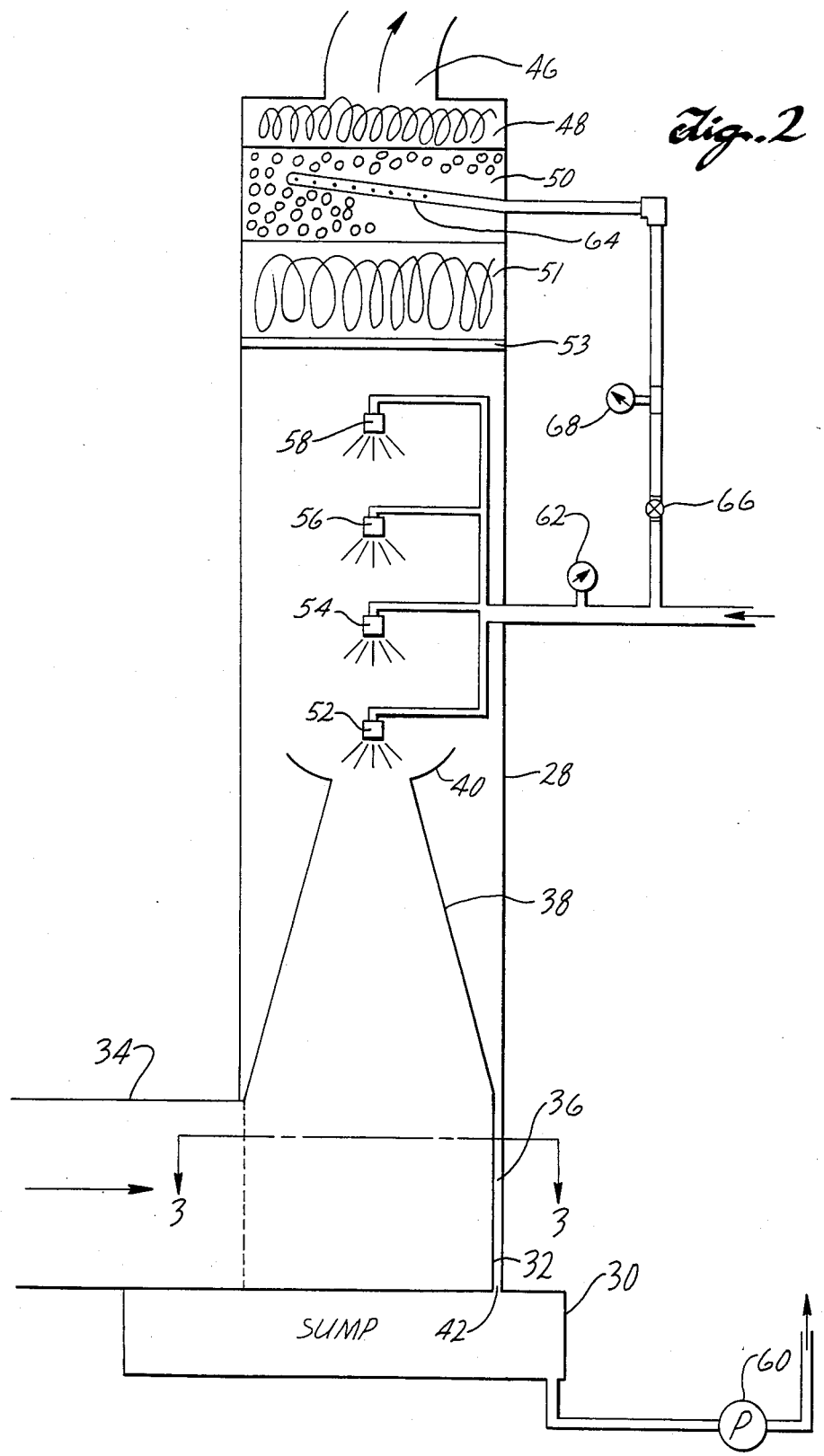
FIG. 2 is a schematic side view of the neutralizing apparatus represented in block form in FIG. 1.

Neutralizing apparatus 24 is shown in detail in FIGS. 2 and 3. A vertically extending, cylindrical columnar housing 28 is supported on top of a closed vessel 30, which serves as a solvent storage sump. At the bottom of housing 28 is disposed a cylindrical, vertically extending passage 32. An annular passage 36 is formed between housing 28 and cylindrical passage 32. Passage 32 has a tangential inlet 34. Inlet 34 has a rectangular cross section and coincides in height with cylindrical passage 32, as depicted in FIG. 2. A conical, upwardly converging passage 38 is connected to the top of passage 32. The top of conical passage 38 has a dish-shaped exit 40. Inlet 34 is connected to the third leg of Y-section 20 (FIG. 1). Annular passage 36 is connected to vessel 30 by a continuous series of openings 42 in the top of vessel 30 extending around the outside of cylindrical passage 32. The interior of cylindrical passage 32 is connected to vessel 30 by a plurality of holes 44 in the top of vessel 30. An outlet 46 at the top of housing 28 is connected to the vacuum side of blower 26 (FIG. 1). Adjacent to outlet 46 at the top of housing 28 is a bed 48 of material for repelling or coalescing water vapor or mist, such as for example, a plastic mesh. Below bed 48 is disposed a bed 50 of packing material such as ceramic particles upon which absorption of unreacted basic and acidic fumes, if any, and salt by a solvent is effected. Below bed 50 is another bed 51 of plastic mesh material for coalescing water vapor or mist. Beds 48, 50, and 51 are supported on a perforated partition 53. Bed 51 prevents the particles of bed 50 from falling through the perforations of partition 53 and repels or coalesces water vapor or mist. The water vapor or mist repelled or coalesced by beds 48 and 51 returns to vessel 30. Spray heads 52, 54, 56, and 58 are disposed one on top of the other between exit 40 of passage 38 and partition 53. Spray head 52 is disposed at the mouth of exit 40 and spray heads 54, 56, and 58 are vertically aligned with spray head 52 and approximately equally spaced from each other. Spray-heads 52, 54, 56 and 58 have openings that produce a downward and outward spray pattern, i.e., they direct fluid under pressure downwardly and outwardly toward the side wall of housing 28.

A solvent for the salt formed by the acidic and basic fumes, e.g., sodium sulfate, is stored in vessel 30. The solvent is heavy enough to fall down to the top of vessel or sump 30. In the preferred embodiment, the solvent is water. The solvent from vessel 30 is pressurized and circulated by a pump 60 to spray heads 52, 54, 56, and 58. The pressure in the line leading to spray heads 52, 54, 56, and 58 is monitored by pressure guage 62. Make-up water is also supplied to spray-heads 52, 54, 56, and 58 to replace water vapor leaving outlet 46. A perforated tube 64 is disposed in bed 50 to wet the ceramic particles thereof with solvent, which absorbs fumes and salt. The solvent under pressure is fed by pump 60 to tube 64 by a line having a shutoff valve 66 and a pressure guage 68.

In operation, acidic and basic fumes in an air carrier are drawn into housing 28 by blower 26. The acidic and basic fumes are mixed in Y-section 20 prior to entering housing 28. In housing 28, a rotational motion is imparted to the mixed fumes by tangential inlet 34 and an upward cyclonic and translational motion is imparted to the mixed fumes by blower 26. Thus, the mixed fumes follow a helical, upwardly moving path through cylindrical passage 32 and conical passage 38. The convergence of conical passage 38 accelerates the upwardly moving carrier. The converging upwardly swirling or cyclone effect on the mixed fumes induced by the shape of passages 32 and 38 causes the acidic and basic fumes chemically to combine and to neutralize the fumes at a higher rate, thereby forming a salt, e.g., sodium sulfate. The solvent eminating from spray heads 52, 54, 56, and 58 dissolves this salt.

The majority of the solvent falls outside of passages 32 and 38, thereby returning via passage 36 and openings 42 to vessel 30. Most of the remainder of the solvent collects on the bottom of passage 32, where it is permitted to drain back into vessel 30 through holes 44.

Any salt or fumes remaining in the carrier are absorbed by the solvent in bed 50. Excess water vapor or mist remaining in the carrier is removed by beds 48 and 51. Thus, mist free and unpolluted air leaves exit 46 and is exhausted from the high pressure side of blower 26 into the atmosphere.

If desired, part of the solvent can be continuously or intermittently removed from vessel 30 and replaced by fresh solvent so as to keep the solvent supplied to spray-heads 52, 54, 56, and 58 in an unsaturated condition.

In summary, the described apparatus first mixes and neutralizes acidic fumes and basic fumes moving in a carrier, and then removes the resulting salt from the carrier by means of a solvent moving countercurrent to the carrier. The resulting solvent can normally be disposed of without creating any environmental hazards, because it contains only the neutral salt. Economy of equipment can be realized because acidic and basic fumes are scrubbed together by the same apparatus.

In general the process is operative to produce a product gaseous stream which consists essentially of the carrier gases and which is essentially free of basic or acidic fumes or salts thereof. In general the gaseous product stream of such quality is produced without the necessity for introducing any additional feed streams into the process other than the feed streams containing the basic and acidic fumes and the feed streams containing the solvent introduced in the absorption-separation zone and absorption zone. The primary absorption-separation zone comprising in the above described specific embodiment the conical passage 38, annular passage 36 and spray heads 52, 54, 56 and 58 and the final absorption zone comprising bed 50.

In general the gaseous product stream is produced with such quality without the necessity of removing any more than the gaseous stream, though for example outlet 46, and solvent stream, as for example in the line containing pump 60.

By non-reacting carrier gas is meant herein that the carrier gas is not reactive to any significant extent with the basic or acidic fumes or salt thereof or liquid solvent used in the process under process conditions. By the expression "the solvent being essentially free of any chemical reactant which will react with the basic or the acidic fumes or the salt therefrom" is meant that the solvent does not contain chemical different from the solvent except for the basic and acidic fumes and the salt formed therefrom which have been absorbed or dissolved in the solvent. By the expression "at least a major part" as used herein is meant at least 50% or more. By the expression "at least a substantial part" as used herein is meant at least 25% or more.

In general this invention enables a gaseous vent stream or product stream to be produced and vented to the atmosphere which contains no more than 0.5% of the basic and acidic fumes contained in the feed streams which were introduced into the system.

In another embodiment, this invention enables such vent stream to contain no more than 0.1% of the basic and acidic fumes contained in such feed streams. In a preferred embodiment of this invention such vent stream contains no more than 0.05% of the basic and acidic fumes contained in such feed streams.

EXAMPLE

The results of a series of experiments conducted with an inlet gas stream containing 0.0153 grams of sulfuric acid per cubic foot of air in the process of this invention is presented in the table. As can be seen, the highest concentration of acid in the discharge stream was 0.000006 gr./cu.ft. which represents a removal of 99.96% of the sulfuric acid originally in the air stream. The data shows that for a water flow rate between 1 and 3 gpm, an outlet air flow of 270 cfm, the maximum sulfuric acid concentration in the exit stream was 0.000006 gr./cu.ft. on a 100% acid basis. In some cases, less than 0.000001 gr./cu.ft. of sulfuric acid was found.

The data demonstrates that essentially all of the acidic or basic fumes can be removed from the carrier gas stream by this invention.

TABLE

| Run No. | Water pH Initial | Water pH Final | Outlet airflow (cfm) | Water Flow (gpm) | Acid concentration (gr./cu. ft. on 100% acid basis) |
|---|---|---|---|---|---|
| 1 | 6.5 | 5.0 | 270 | 2.05 | .000006 |
| 2 | 6.5 | 5.0 | 270 | 2.37 | .000000 |
| 3 | 6.5 | 5.0 | 270 | 1.37 | .000005 |
| 4 | 6.9 | 5.2 | 270 | 2.00 | .000005 |
| 5 | 6.9 | 5.3 | 270 | 1.34 | .000006 |
| 6 | 6.0 | 4.8 | 270 | 2.08 | .000000 |
| 7 | 6.5 | 5.0 | 270 | 2.20 | .000002 |
| 8 | 6.5 | 5.3 | 270 | 1.37 | .000001 |

The described embodiment and example of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the invention can be employed to scrub the fumes from other types of acidic and basic baths. Furthermore, other arrangements of solvent spray-heads could be employed and the use, extent, and nature of the coalescing and absorbing zones at the top of the housing could vary.

What is claimed is:

1. An apparatus for neutralizing basic fumes and acidic fumes and absorbing such fumes and the salts thereof in a liquid solvent comprising:
   a vertically extending columnar housing;
   a cylindrical gas flow passage at the bottom of said housing in inwardly spaced relationship therefrom;
   a tangential gas inlet connected to the inlet of said cylindrical gas flow passage extending through said housing and sealed from direct communication with said housing;
   a conical, upwardly converging gas flow passage the inlet of which is connected in gas tight sealing relationship to the top and outlet of said cylindrical gas flow passage;
   downwardly directed liquid solvent spraying means disposed in said housing above the outlet of said conical passage and directed downwardly along the projection of the axis of said conical passage;
   first coalescing means disposed in said housing at a first elevation above said spraying means and extending radially across said housing and abutting the entire circumference of said housing at said first elevation thereof, for receiving a gaseous stream with an entrained liquid solvent from the lower part of said housing and for coalescing such liquid solvent;
   absorption means disposed in said housing at a second elevation above said first coalescing means and extending radially across said housing and abutting the entire circumference of said housing at said second elevation, for receiving a gaseous stream containing basic and acidic fumes from said first coalescing means and for absorbing, when suitably wetted with a liquid solvent, such basic and acidic fumes;
   means for wetting said absorption means having an outlet disposed within said absorption means and an inlet disposed outside of said housing;
   second coalescing means disposed in said housing at a third elevation above said absorbing means and extending radially across said housing and abutting the entire circumference of said housing at said third elevation, for receiving from said absorbing means a gaseous stream having an entrained liquid solvent and for coalescing such liquid solvent;
   a gas outlet at the top of said housing above said second coalescing means for removing a gaseous stream from said housing;
   a sump for storage of liquid solvent;
   pumping means for supplying liquid solvent under pressure from said sump to said spraying means and said means for wetting;
   first means for connecting the bottom of said cylindrical passage to said sump;
   second means for connecting the bottom of said housing radially outside of said cylindrical passage to said sump;
   means for connecting said pumping means to said spraying means; and
   means for connecting said pumping means to said means for wetting.

2. The apparatus of claim 1 wherein said spraying means comprises a plurality of spray heads arranged vertically one over the other between the outlet of said conical passage and said first coalescing means.

3. The apparatus of claim 1 wherein said sump comprises a vessel under said housing, said housing being supported by the top of said vessel, said first means for connecting the bottom of said cylindrical passage to said sump comprises a plurality of drainage holes in the top of said vessel, and said second means for connecting the bottom of said housing to said sump comprises a series of continuous openings in the top of said vessel around said cylindrical passage.

4. The apparatus of claim 1 wherein said tangential gas inlet has a rectangular cross section and a height equal to the height of said cylindrical passage and said housing is cylindrical and coaxial with said cylindrical passage.

5. The apparatus of claim 1 wherein the top of said conical passage has a dish-shaped exit.

6. An apparatus for neutralizing basic fumes and acidic fumes and absorbing such fumes and the salts thereof in a liquid solvent comprising:
   a vertically extending, columnar housing;
   a cylindrical gas flow passage at the bottom of said housing in inwardly spaced relationship therefrom;
   a tangential gas inlet connected to the inlet of said cylindrical gas flow passage extending through said housing and sealed from direct communication with said housing;
   a conical, upwardly converging gas flow passage the inlet of which is connected in gas tight sealing relationship to the top and outlet of said cylindrical gas flow passage;
   downwardly directed liquid solvent spraying means disposed in said housing above the outlet of said conical passage and directed downwardly along the projection of the axis of said conical passage;

first coalescing means disposed in said housing at a first elevation above said spraying means and extending radially across said housing and abutting the entire circumference of said housing at said first elevation thereof, for receiving a gaseous stream with an entrained liquid solvent from the lower part of said housing and for coalescing such liquid solvent, wherein said spraying means comprising a plurality of spray heads arranged vertically one over the other between the outlet of said conical passage and said first coalescing means;

absorption means disposed in said housing at a second elevation above said first coalescing means and extending radially across said housing and abutting the entire circumference of said housing at said second elevation, for receiving a gaseous stream containing basic and acidic fumes from said first coalescing means and for absorbing, when suitably wetted with a liquid solvent, such basic and acidic fumes;

means for wetting said absorption means having an outlet disposed within said absorption means and an inlet disposed outside of said housing;

second coalescing means disposed in said housing at a third elevation above said absorbing means and extending radially across said housing and abutting the entire circumference of said housing at said third elevation, for receiving from said absorbing means a gaseous stream having an entrained liquid solvent and for coalescing such entrained liquid solvent;

a gas outlet at the top of said housing above said second coalescing means for removing a gaseous stream from said housing;

a sump for storage of liquid solvent;

pumping means for supplying liquid solvent under pressure from said sump to said spraying means and said means for wetting;

first means for connecting the bottom of said cylindrical passage to said sump;

a second means for connecting the bottom of said housing radially outside of said cylindrical passage to said sump, wherein said sump comprises a vessel under said housing, said housing being supported by the top of said vessel, said first means for connecting the bottom of said cylindrical passage to said sump comprises a plurality of drainage holes in the top of said vessel and said second means for connecting the bottom of said housing to said sump comprises a series of continuous openings in the top of said vessel around said cylindrical passage;

means for connecting said pumping means to said spraying means; and means for connecting said pumping means to said means for wetting.

7. The apparatus of claim 6 wherein said tangential gas inlet has a rectangular cross section and a height equal to the height of said cylindrical passage and said housing is cylindrical and coaxial with said cylindrical passage.

8. The apparatus of claim 6 wherein the top of said conical passage has a dish-shaped exit.

* * * * *